INVENTORS H. INOSE
Z. KOONO
BY R. C. Winter
ATTORNEY

EXEMPLARY DELTA MODULATION SYSTEM 3,435,149

TONE GENERATORS FOR DELTA MODULATION TIME DIVISION COMMUNICATION SWITCHING SYSTEMS

Hiroshi Inose, Tokyo, and Zenya Koono, Yokohama, Japan, assignors to Bell Telephone Laboratories, Incorporated, New York, N.Y., a corporation of New York Filed Mar. 17, 1965, Ser. No. 440,453
Int. Cl. H04m *3/42;* H04j *3/04*
U.S. Cl. 179—18 12 Claims

ABSTRACT OF THE DISCLOSURE

In a delta modulation communication system the required tones such as ringing, dial, and busy tones are generated by combinations of logic elements including flip-flops, multivibrators and gates. The pulse trains indicative of increasing, decreasing, and flat pulse codes are combined with pulses indicative of the tone periods for these codes and the resultant is gated to the delta demodulation equipment in the line circuit of the selected line to which the tone is to be applied.

This invention relates to communication systems and, more particularly, to arrangements for providing signaling tones for a telephone system operating on a time division basis and transmitting delta modulated signals.

Known forms of telephone systems accommodate several concurrent conversations on a common transmission path by separating the individual conversations in time. In these systems, each conversation sharing the common transmission path is assigned a time slot which is rapidly and regularly repeated. The time slots provide a brief interval during which signal samples retaining essential voice characteristics or other information are transferred to the common transmission path for subsequent transmission to the individual line circuits, where the samples are used to reconstruct the original information. Connection of each party to a particular call to the common path is completed only during the assigned time slots, thereby assuring the privacy of each conversation.

Dial tone, ringing tone, and busy tone also are sampled within these time slots so that each party placing a call is kept informed of the progress toward completion of the connection to the called line. A time separation system of the type under consideration is described in a patent application of H. Inose, Y. Kawai, Z. Koono, M. Takagi, Y. Yasuda, and Y. Yoshida, Ser. No. 189,873, filed Apr. 24, 1962, now Patent 3,223,784, issued Dec. 14, 1965. This system employs delta modulated voice and information signals nad necessarily is incompatible with unmodulated tone signals. Consequently, conventional dial, ringing, and busy tone sources must each be equipped with an individual delta modulator to provide tone pulses which can be applied to the time separation system.

A significant reduction in cost will be realized if the delta modulators and conventional tone sources can be eliminated. Thus a need exists for a circuit which will produce modulated dial, ringing or busy tone pulses directly, and more particularly, a circuit is needed that does not require delta modulation equipment to make tone source outputs compatible with the time division system. To be entirely satisfactory, the pulses provided by a circuit meeting these requirements must be capable of demodulation into the pleasing and familiar tones which characterize conventional tone sources. These demodulated tone pulses, moreover, must not produce irritating and uncomfortable clicks or other harsh noises that distinguished a poor quality of telephone service from service of a much higher, and hence more desirable quality.

It is a general object of this invention to provide an improved tone source for time separation communication systems.

It is another object of this invention to provide tone pulses compatible with a time separation communication system employing delta modulation techniques.

It is a further object of this invention to provide a more economical tone source for time separation communication systems.

It is still another object of this invention to provide tone pulses capable of being demodulated into substantially pure dial, ringing, ringback, and busy tones.

These and other objects of the invention are attained in one specific illustrative embodiment of the invention in the environment of a time separation telephone system which comprises distinct groups of telephone lines remote from one another and connected through line concentrators to a central office essentially in the manner described in the aforementioned application of H. Inose et al. When a calling line associated with a first concentrator desires connection to a called line associated with a second concentrator, equipment at the central office initially assigns an idle time slot to the calling line. The same or a different idle time slot, as appropriate, is assigned to the called line so a connection can be completed between the parties.

The precise timing required for the operation of the time separation system is provided by a series of pulses from a master clock described in detail in D. B. James et al. Patent No. 2,957,949, issued Oct. 25, 1960. Moreover, the sequence of operations involved in establishing a connection through the system is controlled by call progress code words. Thus, for example, a requirement for dial, ringing or busy tone is identified by distinct call progress code words which are directed to signaling and tone gates. These code words enable the tone gates to apply the appropriate tones to the correct lines as needed according to the status of the telephone calls being served by the system.

In accordance with the specific embodiment of the invention, a combination of logic elements including flip-flop, multivibrator, and gating circuits are provided to generate one specific tone signal, such as ringing tone, in a digital form compatible with the delta modulated speech signals transmitted through the time separation system. The coded tone is applied to the appropriate line circuits for delta demodulation into the familiar, audible ringing signal. More specifically, a clock pulse in a distinct time slot activates the flip-flop and multivibrator circuitry to produce a sequence of coded tone pulses which are applied to the gating means. The gating means are enabled, in response to the tone pulses and an appropriate call progress signal, to permit the coded tone pulses to be transmitted through the gating means to the correct calling line.

Thus in accordance with this embodiment, there is provided a novel and inexpensive circuit arrangement which produces a specific sequence of pulse code modulated tone signals capable of delta demodulation into audible tone signals of excellent quality. These pulse code modulated tone signals are produced, moreover, in a manner that obviates the need for a delta modulator for each tone generator.

It is a feature of this invention that distinct circuitry be arranged in a time separation communication system transmitting delta modulated voice signals to produce a sequence of pulse code modulated tone signals.

It is another feature of this invention that the tone source contains logic elements for producing pulse code modulated tone signals such that a delta demodulator can construct audible tone therefrom.

More particularly, it is a feature of this invention that a combination of logic elements are so arranged as to be responsive to a specific clock pulse and to call progress signals to provide a coded tone pulse for application within the system.

It is a further feature of this invention that a tone generator in a communication system using delta modulation techniques has multivibrator and flip-flop circuitry activated by clock pulses to produce pulse modulated tone signals for application to the system in response to a distinct call progress signal.

A more complete understanding of this invention and of these and other features thereof may be gained from consideration of the following detailed description and the accompanying drawing, in which.

Figure 1:
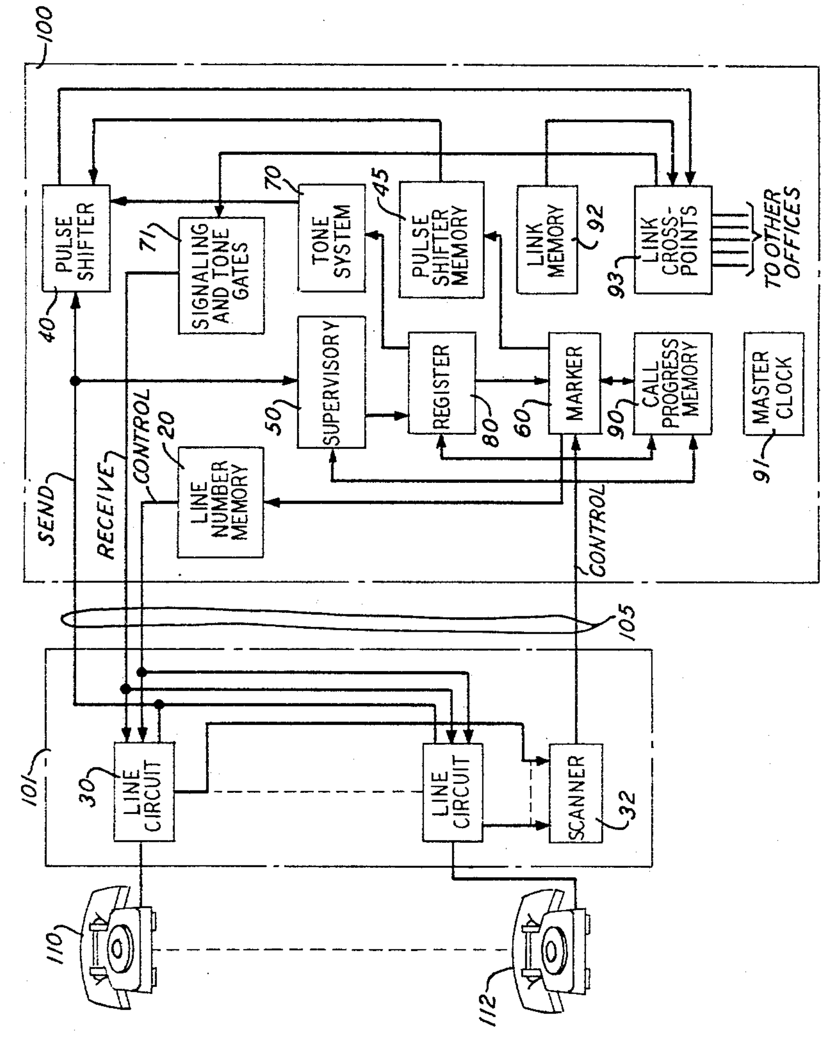
FIG. 1 is a block diagram representation of a telephone system showing the particular facilities available in a central office to serve a remote concentrator as described in the H. Inose et al. application hereinbefore mentioned.

Because of the research of C. E. Shannon and others in the field of communication theory ("A Mathematical Theory of Communication," C. E. Shannon, The Bell System Technical Journal, volume XXVII, No. 3, pp. 379 et seq., July 1948), a broad spectrum of telephone communication transmission possibilities is now available for exploitation. Pulse amplitude modulation (PAM) techniques are an example of a practical embodiment of these theoretical researches.

Thus for a signal of duration T which contains no frequencies greater than $W_0$ cycles per second (c.p.s.), it has been shown that the signal can be described completely by $2W_0T$ pieces of data, which are taken by sampling the instantaneous amplitude of the signal at a regular rate of $2W_0$ samples per second. The original signal may be reconstructed by generating from each sample a proportional impulse and passing this regularly spaced series of impulses through a low pass filter of cut-off frequency $W_0$.

This procedure of taking samples at uniform intervals leaves the communication channel or line available during the periods between samples for the transmission of other signals in a like manner. This technique for transmitting a plurality of sampled signals over one line is known as "interleaving the signals." This technique of interleaving in time a plurality of samples, each defining a particular signal, has formed the basis of modern "time division" communication systems, which are characterized by establishing within the communication transmission system a distinct repetitive cycle of time slots which provide the intervals required for sampling the respective signals to be transmitted. Moreover, it has been found for voice communications, that a maximum voice frequency of 4,000 cycles per second can be expected. Therefore, a plurality of voice signals can be completely described by assigning an individual time slot in the repetitive cycle to each of the signals to be transmitted such that a sample of each signal can be taken in the appropriate time slot at a rate of two times the highest frequency encountered, or 8,000 cycles per second.

Because of noise, distortion, and crosstalk between pulses, it is impossible to transmit the exact amplitude of each signal over any substantial distance, more particularly because these disturbances are aggravated as the signal is amplified by successive repeaters. To overcome this inherent difficulty, pulse amplitude modulation has been further refined by the development of pulse code modulation (PCM).

Pulse code modulation "quantizes" the amplitude of the signal sample by converting the sample into one of a group of pulses having discrete allowed levels. The pulse to which the sample is quantized is that which is closest in amplitude to the sample. Each quantized sample, moreover, is assigned a specific code group (usually binary and having seven place values) to describe the amplitude of the quantized sample. The code groups for each of a plurality of samples are interleaved and transmitted as a time sequence of pulses over the same channel. The pulses are reshaped at intervals as required, thereby providing a rugged, interference-free transmission system. At the receiver, the code groups are decoded to form a series of quantized samples which are sent through a low pass filter to reconstruct the original signal.

Delta modulation is a further development of pulse code modulation principles. In delta modulation, a feedback network is used ot take the derivatives of a signal sample by subtracting the preceding sample from the incoming sample. The difference or increment is then quantized whereby a positive pulse represents a positive increment, and no pulse, or a negative pulse, represents a negative increment (or decrement) between the samples. Thus delta modulation eliminates redundancy, one delta pulse, or the absence thereof, defining the quantized sample, as distinguished from the usual seven place pulse code group required in PCM systems to describe the quantized sample.

These signal derivatives are interleaved and transmitted as a time sequence of pulses as hereinbefore described in connection with PCM systems. At the receiver, the pulses are decoded to indicate whether the difference between samples is indicative of a rising or falling signal amplitude. The quantized pulses are then integrated, or added together by filtering, to provide an output which closely resembles the input signal.

Figure 3:
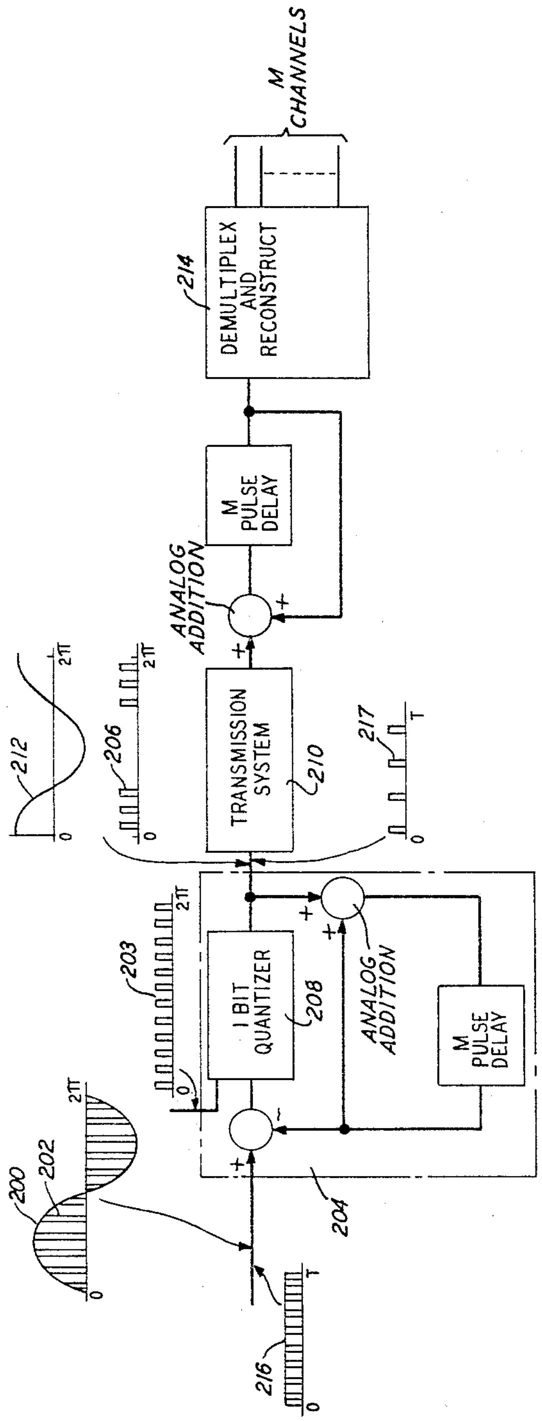
FIG. 3 is a block diagram representation of an exemplary delta modulated communication system.

As shown in FIG. 3, an input signal represented by sine wave 200 is electrically differentiated by delta modulator 204. A pulse train 203 is applied as a second input to delta modulator 204. Positive pulses 203 coincide in time with the sampling intervals 202 of the input sine wave 200. By means of the feedback circuit, each sample of the incoming signal is compared with a representation of the preceding sample which has been locally delta demodulated in the feedback circuit.

A positive difference between the incoming sample and the locally delta demodulated sample is utilized to trigger quantizer 208 if the resultant increment exceeds a specific threshold value. The enabled circuit 208 passes a pulse from train 203 to transmission system 210 and to the feedback loop in delta modulator 204.

Application of a pulse increment having an amplitude which is below the threshold value will inhibit circuit 208 so the next pulse in train 203 will not be passed to the feedback loop or to the transmission system 210.

Because the derivative of the sine wave 200 is cosine 212, quantizer output pulses 206 are, in effect, transmitting a PCM cosine in a binary code having only one place value. Pulses 206 are received in demodulator 214 and are reconstructed into a sine wave signal by the reverse process of electrically adding together or integrating the pulses representing the cosine function. The integration process is accomplished by filtering the added pulses to provide an output approximating the original sine wave signal 200.

The array of positive pulses 206 representing the derivative of the sine curve samples is representative of the increasing portion or positive slope of sine wave 200. In this instance a positive signal appears in each sampling interval or at least more frequently in the sequence than the no signal condition.

A "flat" signal, as produced for example by a steady state signal during transmission by a calling station of the designation of a called station, contains a sequence of alternate positive and no signal conditions. Such a sequence is illustrated by the flat pulse code in FIG. 2. This condition is evident upon further consideration of the delta modulation circuit operation in FIG. 3.

Figure 2:
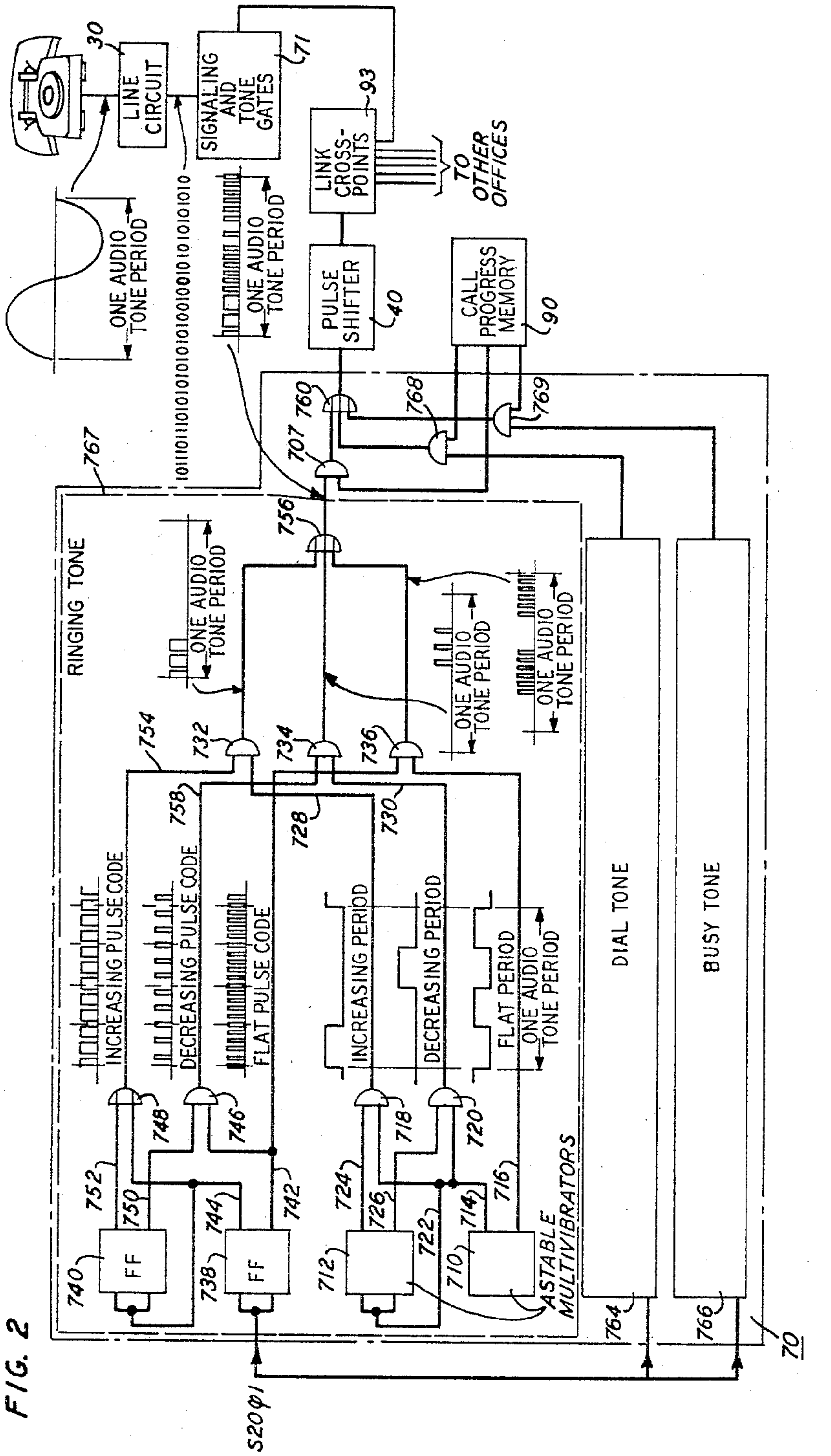
FIG. 2 is a representation in block diagram form of one embodiment of a tone generator according to the present invention.

Consider that the signal 216 is applied to the delta modulator circuit 204 corresponding to the signal transmitted in a dial pulse interval. This signal is sampled eight times in the illustration. The first sample following the positive transition is compared with the previous condition, i.e., no pulse, in the delta modulator 204 and the resultant difference, a positive pulse of sufficient amplitude, triggers quantizer 208 to pass a pulse 203. This pulse is fed back and compared with the next sample, again a positive signal. This time the comparison produces a signal of insufficient amplitude to trigger quantizer 208. Upon feedback the resultant no pulse output condition is compared with the next positive sample and a positive output pulse is again produced. This alternate positive and no pulse sequence, as indicated by the output array 217, will persist for the duration of the steady state input signal 216. A decreasing pulse code representing a negative slope, as illustrated in FIG. 2, may then be considered as a combination of positive and no signal conditions in which the no signal condition is predominant.

Because of the error, or noise, introduced by the quantizing step, it has been found that a closer approximation to the usual ringing tone can be provided by transmitting a series of digital pulses which deviate from the quantized mathematical derivative of a sine function. Thus a more acceptable tone is generated by a series of digital pulses which represent increasing, flat, decreasing, and flat signals.

Turning now to FIG. 1 of the drawing, the basic elements are shown of a time division telephone system as disclosed in the aforementioned H. Inose et al. patent application, which will be described in general terms to provide a basis for the detailed description of the improvements realized in accordance with this embodiment as depicted in FIG. 2.

In FIG. 1 a line concentrator 101, using delta modulation principles, hereinbefore described, in the line circuits such as 30 and serving telephone stations such as 110 and 112, is connected by a transmission channel 105 comprising SEND, RECEIVE, and CONTROL leads to a central office 100. A party at station 110, in requesting a connection to another station, such as 112, may be assigned by central office 100 to one time slot in a frame or recurring cycle of time slots. In a similar manner, other telephone connections are assigned to different time slots in the frame, so channel 105 is shared in time by sampling each of the active telephone calls in a corresponding, distinct time slot once in each frame.

System operation is controlled by signal pulses which are transmitted in specific time slots. Each time slot S, moreover, is divided into four phases $\varphi_1$–$\varphi_4$, and particular control functions, such as the activation of tone system 70, are performed by clock signals sent from a master clock 91 during specific phases H of time slot S. In this manner, the clock signal for activating the tone generators which may, for example, occur in time slot 20, phase 1 would be designated $S_{20}\ \varphi_1$.

To establish a connection between two subscribers, scanner 32 at remote concentrator 101 first detects a telephone off-hook. A marker 60 at central office 100, responding to scanner 32, signals line number memory 20 to determine if the scanned line is busy. If the line was previously idle, marker 60 assigns an idle time slot, and the line designation is recorded in the line number memory 200.

A call progress memory 90 in central office 100 stores call progress code words, indicative of the current status of a call, to control the various switching and control elements. Thus in response to recording the line number designation in line memory 20, call progress memory 90 causes an idle register 80 to be engaged preparatory to the receipt of the called party's identifying digits.

Upon seizure of idle register 80, a signal is transmitted from master clock 91 in time slot $S_{20}\ \phi_1$ to tone system 70, shown in detail in FIG. 2. The clock pulse in $S_{20}\ \phi_1$ activates tone system 70 which begins transmitting dial tone to the calling station via pulse shifter 40, link crosspoints 93, signaling and tone gates 71, the RECEIVE lead of the transmission channel 105 and the corresponding line circuit 30. The signaling and tone gates 71 are enabled by the simultaneous receipt of the dial tone pulses from tone system 70 and the phase signals, indicative of a call ready for dialing, to pass the pulses through gates 71.

A supervisory circuit 50 distinguishes between voice and supervisory signals transmitted to central office 100 over the send lead. Upon detecting the digits identifying the called line, the supervisory circuit 50 delivers them to the engaged register 80. As soon thereafter as the busy test equipment is available, the condition of the called line is investigated to determine its busy or idle condition and to cause the appropriate call progress signal to be applied to signaling and tone system 70.

Thus the simultaneous arrival at signaling and tone gates 71 of ringing tone and the phase signals enables gates 71 and applies the ringing tone pulses to the appropriate called and calling lines, respectively. In a similar manner, the simultaneous receipt at gates 71 of pulse coded busy tone and the phase signals enables gates 71 to apply busy tone pulses to the proper calling line.

As hereinbefore considered, delta modulated tone pulses characterizing the prior art have been produced by applying the output of a conventional tone generator to a delta modulator circuit. The delta modulated tone pulses are transmitted to the receiving line where they are demodulated and converted back into the tone signal having the characteristics of the original signal. Clearly, those known circuits which generate conventional tone signals, delta modulate the signals and then demodulate the pulses back into tone signals do not exploit fully the flexibility and potential inherent in a delta modulated signal transmission system.

A substantially more sophisticated and advantageous technique is provided in accordance with an aspect of my invention by the embodiment of tone system 70, shown in FIG. 2, of which only the ringing tone generator is illustrated in detail. This system comprises an array of logic circuits for generating a digital pulse code characterizing the derivative of a specific tone signal. These pulses, which are produced directly, and not as a consequence of having processed a conventional ringing tone input, are delta demodulated in line circuits such as 30 to approximate conventional ringing current fluctuations.

The ringing tone pulses produced by ringing tone generator 767, as illustrated by the ONE AUDIO TONE PERIOD in FIG. 2, each pulse of which may extend over several office frames, are sampled in a time interval assigned to a called line in each repeated frame of time intervals, and the samples are transmitted first to pulse shifter 40 and then to link crosspoints 93. The delta modulated tone pulse samples then are sent from link crosspoints 93 to signaling and tone gates 71 for application to the appropriate line circuit, where the pulse samples, as illustrated in binary code form for a single time slot in repetitive office frames, are delta demodulated into the sine wave shown in FIG. 2.

The manner in which the general operation of central office 100 and line concentrator 101 proceeds is considered in detail in the aforementioned H. Inose et al. patent application.

*Tone system*

To understand more completely the detailed operation of ringing tone generator 767 to which this embodiment is directed, it will be necessary to consider the logic circuits shown in FIG. 2 which produce the sequence of coded tone pulses in a form which can be delta demodulated into conventional ringing tone.

The logic circuitry for the ringing tone genertor 767 comprises a pair of conventional astable multivibrators 710 and 712 connected in cascade, such that the output of multivibrator 710 controls the input to and the output of multivibrator 712.

The multivibrator 710 has two output leads 714 and 716. The output lead 714 is connected in parallel with coincidence or AND gates 718 and 720, and voltage supply lead 722 of the multivibrator 712.

The multivibrator 710, having two conditions of stable equilibrium, produces square waves, such as the flat period wave illustrated above lead 716 of FIG. 2. The positive-going pulses provided by multivibrator 710 on lead 716 are 180° out of phase with the pulses on lead 714. The pulse frequency of multivibrators 710 and 712, moreover, are determined by proper selection of the multivibrator time constants in a manner well known in the art. In this illustration, the time constants are chosen to provide a distinct audio tone period of four pulse width's duration, such that the tone period will extend over many frame intervals, as hereinafter described.

The positive pulse on lead 714 applies a potential to voltage supply lead 722 of multivibrator 712 at a regular frequency, thereby limiting the operation of multivibrator 712 only to those time intervals during which a positive pulse is present on lead 714. The multivibrator 712 is thus necessarily restricted to operation during one-half of the time multivibrator 710 is operating. This intermittent operation of multivibrator 712 produces alternate output pulses of opposite phase separated from each other by one pulse width on leads 724 and 726, at times coincident with the presence of positive pulses on lead 714.

Leads 724 and 726 are connected to AND gates 718 and 720, respectively. Receipt of a positive pulse activates multivibrator 712, causing a positive pulse to be applied to lead 724 (assuming the previous pulse from multivibrator 712 has been applied to lead 726). The simultaneous receipt of the positive pulses on leads 724 and 714 enables AND gate 718 thereby permitting the increasing audio tone period pulse, illustrated above lead 728, FIG. 2, to be passed through gate 718. Similarly, as alternate pulses are applied to lead 714, a corresponding positive pulse is applied to lead 726, which, together with the pulse on lead 714, enables gate 720 to permit the decreasing audio tone period pulse, illustrated above lead 730, to be transmitted through AND gate 720.

Thus the multivibrator logic circuitry produces three sets of output pulses during each audio tone period, only one pulse being passed through each of the gates 718 and 720 during this period such that these pulses are out of phase with each other and are also out of phase with the flat period pulses applied to lead 716.

The pulses transmitted over leads 716, 728, and 730 are applied to AND gates 732, 734, and 736, respectively, which gates assist in providing pulse code modulated signals, as described subsequently.

Conventional flip-flop circuits 738 and 740, for producing the ringing tone signals in digital form, are also connected in cascade, to permit the output of flip-flop 738 to iontrol the output of flip-flop 740. A pulse in time slot $S_{20}$ $\phi_1$ triggers flip-flop 738 once during each frame, in the repeated cycle defined by the time slots, to switch the flip-flop from one stable state to the other stable state.

Thus if a positive potential was previously established on output lead 742, a pulse in time slot $S_{20}$ $\phi_1$ switches off the potential on lead 742 and applies a positive potential to lead 744. Lead 744 is connected in parallel to the trigger of flip-flop 740 and to OR gate 748 for providing digital pulses in a distinct increasing pulse code pattern, as shown above lead 754 in FIG. 2. As the positive potential on lead 744 is applied, flip-flop 740 changes states and applies a positive potential to lead 750. Thus a positive pulse on lead 744 is passed through OR gate 748 to provide one pulse in the increasing pulse code.

In the next successive frame of time slots, a pulse in slot $S_{20}$ $\phi_1$ switches multivibrator 738 back to the other stable state so that a positive potential is once again applied to lead 742, and the potential applied to lead 744 is removed. The drop in voltage on lead 744 does not trigger flip-flop 740 and disturb the conducting state of the circuit. Consequently, flip-flop 740 continues to apply a potential to lead 750. The simultaneous receipt of potentials on leads 742 and 750 at AND gate 746 produces a digital pulse in a distinct decreasing pulse code pattern, as shown above lead 758 in FIG. 2. The flat pulse code shown above lead 742 in FIG. 2 is provided as one input to AND gate 736 by one output of flip-flop 738.

In the next appearance of time slot $S_{20}$ $\phi_1$, another triggering pulse is applied to flip-flop 738, causing the flip-flop to switch back to the stable state which produces a potential on output lead 744. The potential applied to lead 744 causes flip-flop 740 to switch to the stable state that provides a potential on output lead 752. These potentials on leads 744 and 752 are transmitted through OR gate 748 to produce the second pulse characterizing the increasing pulse code.

A pulse in the next appearance of time slot $S_{20}$ $\phi_1$ triggers flip-flop 738 to produce a potential on output lead 742. The drop in potential on output lead 744 caused by the triggering pulse in $S_{20}$ $\phi_1$ does not disturb the conducting state of flip-flop 740 and consequently the potential remains on output lead 752 and is transmitted through OR gate 748 to provide a third pulse in the increasing pulse code. AND gate 746, receiving a potential only from output lead 742, because lead 750 is not conducting, remains disabled and therefore does not provide a pulse for the decreasing pulse code. The pulse on lead 742 also is applied directly to AND gate 746 and provides a second pulse in the flat pulse code.

A pulse in the next slot $S_{20}$ $\phi_1$ triggers flip-flop 738 such that lead 742 is nonconducting, while a potential is applied to lead 744 which is transmitted through OR gate 748. The pulse on lead 744 also triggers flip-flop 740 to apply a potential to lead 750. Gate 746 remains disabled because lead 742 is not conducting.

Thus a complete cycle of operation for the logic circuitry characterized by flip-flops 738 and 740 produces increasing, decreasing, and flat digital pulse codes. Note that the pulse width characterizing the increasing pulse code is the equivalent of three of the pulse widths which characterize the flat and decreasing pulse codes. The flat and decreasing pulse code widths, moreover, have a duration equal in time to one full office frame of recurring time slots. This cycle is repeated in the manner hereinbefore described to provide, on a continuous basis, the array of digital pulses required for producing delta modulated ringing tone code pulses.

AND gates 732, 734, and 736, previously referred to, provide a means for gating the ringing tone pulses out of the ringing tone generator 767 in a coherent code pattern or sequence which can be delta demodulated into conventional ringing tone. Thus the pulses characterizing the increasing pulse code, transmitted through OR gate 748 on lead 754 to AND gate 732 coincident with the pulse for the increasing period from AND gate 718 on lead 728, enables AND gate 732, such that the increasing pulse code can be transmitted through OR gate 756 to AND gate 707 during the first quarter of the audio tone period.

In a similar manner, the flat pulse code on lead 742 is applied to AND gate 736 during the second quarter of the audio tone period coincident with the pulse characterizing the flat period, thereby enabling gate 736 to transmit the digital pulses for the flat period through OR gate 756 to AND gate 707.

During the third quarter of the audio tone period, the pulses on lead 758 characterizing the decreasing pulse code coincides at AND gate 734 with the decreasing period pulses on lead 730. The simultaneous receipt of these pulses enables AND gate 734, so the decreasing pulse code is transmitted through AND gate 734 and OR gate 756 to AND gate 707.

In the final quarter of the audio tone period the flat pulse code is transmitted through OR gate 756 to AND gate 707 in the manner described in connection with the second quarter of the audio tone period.

Thus there is provided in accordance with this invention a sequence of increasing, flat, decreasing, and flat digital pulses during an audio tone period that is compatible with a delta modulated time division switching system, and which can be delta demodulated at line circuits 30 (FIG. 1) into the familiar ringing tone.

These tone code pulses are applied to the proper line circuits in the manner described in the aforementioned H. Inose et al. patent application. Thus the ringing tone code pulses are sent to pulse shifter 40 and then to link crosspoints 93 for transmission to signaling and tone gates 71 in the appropriate office.

AND gate 707 is enabled in response to the simultaneous receipt of the ringing tone code pulses and the appropriate call progress word, which indicates that the called line or all channels are not busy. These call progress code words are sent from call progress memory 90 to AND gate 707. The coded pulses from AND gate 707 are transmitted through OR gate 760 and the network to line circuit 30 for delta demodulation into conventional ringing tone.

Other coded tones, such as the codes for dial tone and busy tone, can be produced by changing the audio tone period and digital pulse code to provide the tone code pulse sequences characterizing these tones as known in the art. Thus the logic circuitry of FIG. 2 also can be provided to apply dial tone code pulses, as indicated by dial tone generator 764, to AND gate 768 which is enabled in response to the simultaneous receipt of the dial tone pulses and the appropriate call progress word from the call progress memory 90 to the OR gate 760 for transmission to the pulse shifter 40. Likewise busy tone code pulses can be provided by busy tone generator 766, of FIG. 2, to AND gate 769 which is also enabled in response to the simultaneous receipt of the busy tone pulses and the appropriate call progress word from the call progress memory 90 to the OR gate 760 for transmission to the pulse shifter 40.

It is to be understood that the above-described arrangements are merely illustrative of the application of the principles of the invention. Numerous other arrangements may be devised by those skilled in the art without departing from the spirit and scope of the invention.

For example, by gating the output of an astable multivibrator in appropriate time slots to trigger a flip-flop circuit, coded tone pulses of acceptable quality can be produced. The output of a pair of cascaded flip-flop circuits, moreover, can be combined with the output of an astable multivibrator to trigger a flip-flop circuit which provides coded tone pulses that also may be delta demodulated into tone of high quality.

What is claimed is:

1. In a communication system having a plurality of lines, means associated with each line for delta modulating information generated at stations terminating the lines and for delta demodulating signals received for application to the lines, means for generating delta modulation tone signals for said lines, said tone signal generating means comprising pulse code generator means for generating a plurality of different pulse output trains and means for logically combining all the outputs of said generator means to produce a single pulse code train, and means for applying said delta modulation tone signals to said demodulating means.

2. A tone generator for a delta modulated transmission system comprising first means for providing a plurality of digital pulse trains, second means for providing a plurality of pulses establishing repetitive tone periods, third means for combining all the outputs of said first and second means to produce a single delta modulation pulse code train, and means for applying the output of said third means to said transmission system for demodulation into audible tone.

3. In a switching system comprising a plurality of channels transmitting delta modulated signals, the combination for making available a plurality of coded tones in a form suitable for delta demodulation by the system comprising first means including multivibrator means for producing first pulses in repetitive time intervals, second means including flip-flop means for producing second digital pulses, third means including gating means connected to said first and second means for combining said first and second pulses in said repetitive time intervals and for producing a single pulse code output and means for applying said output of said third means to the transmission channels.

4. A system for generating audio tones comprising means for defining a tone period and for generating a first plurality of different pulse trains during said tone period, means for generating a second plurality of different pulse trains during said tone period, there being a corresponding pulse train of said second plurality for each pulse train of said first plurality, means for combining corresponding ones of said first and second pluralities of pulse trains, means for multiplexing the combined pulse trains to form a single coded pulse train containing segments of each combined pulse train in a regular sequence during said tone period and suitable for delta demodulation, and means for delta demodulating said single pulse train.

5. A system in accordance with claim 4 wherein said means for generating said first plurality of pulse trains comprises a pair of multivibrators connected in cascade.

6. A system in accordance with claim 4 wherein said means for generating said second plurality of pulse trains comprises a pair of flip-flops connected in cascade.

7. A system in accordance with claim 4 wherein said combining means comprises AND logic gate means and said multiplexing means comprises OR logic gate means.

8. In a switching system, the combination for making available a plurality of coded signals for selective sampling and delta demodulation into tones by the system comprising multivibrator means for providing pulses in repetitive time intervals, flip-flop means for providing digital pulses, first gating means connecting said multivibrator means and said flip-flop means to provide a plurality of coded signals for selective sampling by the system, second gating means connected to the output of said first gating means for connecting said multivibrator means and said flip-flop means to the system, and means for enabling said second gating means to apply said coded signals to the system.

9. A tone generator for use in a communication system transmitting delta modulated signals comprising multivibrator means for providing first pulses in different time intervals during a tone period, flip-flop means for providing second pulses in different digital signal patterns, means for activating said flip-flop means to provide said signal patterns in a regular sequence, first coincidence gating means connected to said multivrator means and said flip-flop means, and second coincidence gating means responsive to the output of said first gating means and a distinct control pulse for applying the resultant signals to the system for delta demodulation.

10. An audio tone generator for use in a communication system transmitting delta modulated signals comprising a pair of multivibrator circuits connected in cascade relation for providing a first pulse on each of a plurality of output conductors, a pair of multivibrator coincidence gates each connected to at least one of the output leads from both of said multivibrator circuits to provide said first pulses in different time intervals during an audio tone period, flip-flop means for providing second pulses on output leads in a regular sequence, each of said flip-flop means output leads corresponding to one of said multivibrator circuit output conductors, flip-flop gating means each connected to at least one of the output leads of said flip-flop means to provide said second pulses in different digital patterns, output gating means connected to said multivibrator gates and said flip-flop gating means for providing pulse code modulated signals, and gate means connected to said output gating means and responsive to said pulse code modulated signals for applying said coded signals to the system for delta demodulation into tones.

11. An audio tone generator according to claim 10 including a second output gating means connected to one of said multivibrator output leads and one of said flip-flop output leads for providing a pulse code modulated signal and means for activating said flip-flop means to provide said second pulses in a regular sequence.

12. An audio tone generator for use in a communication system transmitting delta modulated signals comprising a pair of astable multivibrator circuits connected in cascade relation for providing a first pulse on each of a plurality of output leads, a pair of AND gates each connected to at least one of the output leads from each of said multivibrator circuits to provide said first pulses in distinct time intervals during an audio tone period, a pair of flip-flop circuits connected in cascade relation for providing second pulses on output leads, each of saidi flip-flop circuit output leads corresponding to one of said multivibrator circuit output leads, means for activating said flip-flop circuits to provide said second pulses in a regular sequence, an AND gate connected to at least one output lead from each of said flip-flop circuits to provide pulses in a first distinct digital pattern, an OR gate connected to at least one other output lead from each of said flip-flop circuits to provide pulses in a second distinct digital pattern, first and second output AND gates connected to said AND and OR flip-flop gates and said pair of multivibrator AND gates to provide pulse code modulated signals, a third output AND gate connected to at least one output lead from said pair of flip-flop circuits and to one output lead from said pair of multivibrator circuits to provide a pulse code modulated signal, a delta demodulator for converting said coded signals into tones, and gating means responsive to said output AND gates for applying said coded signals to said delta demodulator.

References Cited

UNITED STATES PATENTS 3,050,589 8/1962 Vaughan.
3,207,851 9/1965 Fukinuki.

KATHLEEN H. CLAFFY, *Primary Examiner.*
BARRY PAUL SMITH, *Assistant Examiner.*

U.S. Cl. X.R.

179—15